(12) United States Patent
Kao

(10) Patent No.: US 8,803,804 B2
(45) Date of Patent: Aug. 12, 2014

(54) MOUSE STRUCTURE WITH ADJUSTABLE CLICKING FORCE FUNCTION

(75) Inventor: Kuo-Hua Kao, Taipei County (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 855 days.

(21) Appl. No.: 12/699,247

(22) Filed: Feb. 3, 2010

(65) Prior Publication Data

US 2011/0069008 A1 Mar. 24, 2011

(30) Foreign Application Priority Data

Sep. 24, 2009 (CN) .......................... 2009 1 0192733

(51) Int. Cl.
*G06F 3/033* (2013.01)
*G06F 3/0354* (2013.01)
(52) U.S. Cl.
CPC .... *G06F 3/03543* (2013.01); *G06F 2203/0333* (2013.01)
USPC ......................................................... 345/163

(58) Field of Classification Search
USPC ........................................................... 345/163
See application file for complete search history.

(56) References Cited

U.S. PATENT DOCUMENTS 6,844,872 B1 * 1/2005 Farag et al. .................... 345/163
2009/0009473 A1 * 1/2009 Ho ................................ 345/163

* cited by examiner

*Primary Examiner* — William Boddie
*Assistant Examiner* — Towfiq Elahi
(74) *Attorney, Agent, or Firm* — Li&Cai Intellectual Property (USA) Office

(57) ABSTRACT

The invention discloses a mouse structure with click force adjustable function, which comprises a shell, a circuit board module, and at least one adjustable mechanism. The adjustable mechanism is setting inside the shell, and comprises a supporting body, an adjustable plate and an adjustable component. The adjustable mechanism is adjusted via the adjustable component, so that the place the free-end of the adjustable plate touching the key portion is changed, and the force the adjustable plate clicking the switch module is accordingly changed, which provides function that the user can adjust the click force finely to a suitable one.

7 Claims, 5 Drawing Sheets

MOUSE STRUCTURE WITH ADJUSTABLE CLICKING FORCE FUNCTION

BACKGROUND OF THE INVENTION

1. Field of the Invention

The present invention relates to a computer input, indexing, other manual input device including a mouse device or structure, especially a mouse structure feasible for users to adjust the clicking force depending on the users' habits or preference.

2. Description of Related Art

The mouse and the keyboard are indispensable input devices for the computer. An important function of the mouse is to control the cursor. One input method of the mouse is through the "click". Especially in the series of AUTOCAD or PRO/E or other environment of graphic software, or in the operating environment of the multi-media, the user generally depends on a mouse, or it's functional equivalent to operate the cursor and point at the target. The user operates program functions through the mouse by clicking one or more buttons or keys on the mouse.

However, the force necessary to affect a click of a traditional mouse, which amounts to a specific value, is designed by the designer. That force (click, or clicking force) exerted by the user should exceed or at minimum equal the force designed by the designer, such that the movable button or key portion of the mouse can move to be effective. Therefore, it is not feasible for users to adjust the clicking force depending on the users' habit. At the same time, with interactive electronic products becoming more widely used, the populations of users are becoming more varied. Children and the elderly are joining the ranks of mouse-clickers.

However, for the elderly and children, as well as others less able to exert the clicking force others who are more able to exert the required force. Possibilities also exist for repetitive stress damage, particularly in instances in which a user clicks the mouse for a long period of time, the wrist of that user may experience muscular pains. With this in mind, particularly for children, their growth and development may be jeopardized for the computer game player, long periods of time spent clicking the mouse has a similar potential for still causing similar muscular pain as well. For the white collar worker using the mouse for a long time, it will be useful or necessary for him or her to adjust the click force depending on personal habits or preferences.

Therefore, it is at least useful and possibly necessary, for the present circumstances, to provide a mouse feasible for different users to adjust the click force depending on the users' habits or preferences.

SUMMARY OF THE INVENTION

The present invention is to provide a mouse feasible or available for users to adjust the click force depending on the users' habits or preference. To solve the problems considered above, the present invention provides the following structure: A mouse structure with adjustable click force function, comprising: a shell including a key portion; a circuit board module located in the shell; and at least one adjustable mechanism, located in the shell, electrically connected with the circuit board module, the adjustable mechanism including: a supporting body, corresponding to the key portion and having a switch module, the switch module transmitting information of clicking to the circuit board; an adjustable plate, one end of the adjustable plate pivotally connected with the supporting body, letting the key portion and the switch module located/corresponding on different positions of the adjustable plate; an adjustable component, movable and arranged in the shell, the adjustable component moving the adjustable mechanism, changing the different position/portion of the adjustable plate corresponding to the key portion, for adjusting/changing the strength of the force applied to the switch module.

In the preferred example, the number of the key portions is two, and one of the key portions is in vicinity of/adjacent to another, the two key portions are corresponding to the two adjustable mechanisms, each switch module of the adjustable mechanism is further electrically connected with the circuit board module corresponding to the adjustable mechanism.

In the preferred example, the switch module includes a switch element and a trigger element, the trigger element is clicked to turn on or turn off the switch element.

In the preferred example, the adjustable component includes a force transfer piece and a guiding groove located on the shell, and the force transfer piece includes a bump, located and movable in the guiding groove.

In the preferred example, the bottom or inner surface of the key portion of the shell extends a contact portion, and the contact portion is corresponding to the free-end of the adjustable plate.

In the preferred example, the shell has a recess, the adjustable component includes a base which has an extending portion, the base supports the supporting body and the circuit board module, the base is located above the recess and the extending portion is located in the recess, such that the adjustable mechanism can move along with the recess.

The present invention, compared with the prior art, exists merits as follows:

1. Concise structure: the present invention arranges the adjustable mechanism in the shell of the mouse. The adjustable mechanism is electrically connected with the circuit board module. The present invention ingeniously applies leverage principles. The user can adjust the adjustable component to further move the adjustable mechanism. Therefore, the contact portion of the key portion is corresponding to the different portion of the adjustable plate, in order to change the force of pivoting arm exerted from the contact portion and to further change the magnitude of torque to trigger the switch module, such that the mouse is available to adjust the clicking force.

2. Easy to operate: The adjustable component is used for moving the adjustable mechanism. The adjustable component includes a force transfer piece and a guiding groove. The bump of the force transfer piece cooperates with the guiding groove. The bump moves along with the guiding groove to further move the adjustable mechanism. Therefore, it is easy and convenient for the user to move the adjustable mechanism. In the process to operate the mouse, the user can change the clicking force anytime.

3. Slightly adjustable mouse suitable for wide range of people: With the electronic products more widely used, the populations of the user become more various. Children and elder people are also part of the users of the mouse. If the users click the mouse for a long time, the wrist of the users will have muscular pains. Therefore, the present invention ingeniously uses the leverage principles between the adjustable plate and the supporting body to let the clicking force of the mouse adjustable. The mouse can be widely used in those groups.

The present invention can not only be freely adjusted the clicking force depending on the uses' needs or habits, but also suitable for two or three key portions mouse, optical or scroll mouse, wire or wireless mouse.

DETAILED DESCRIPTION OF THE PREFERRED EMBODIMENTS

Figure 1:
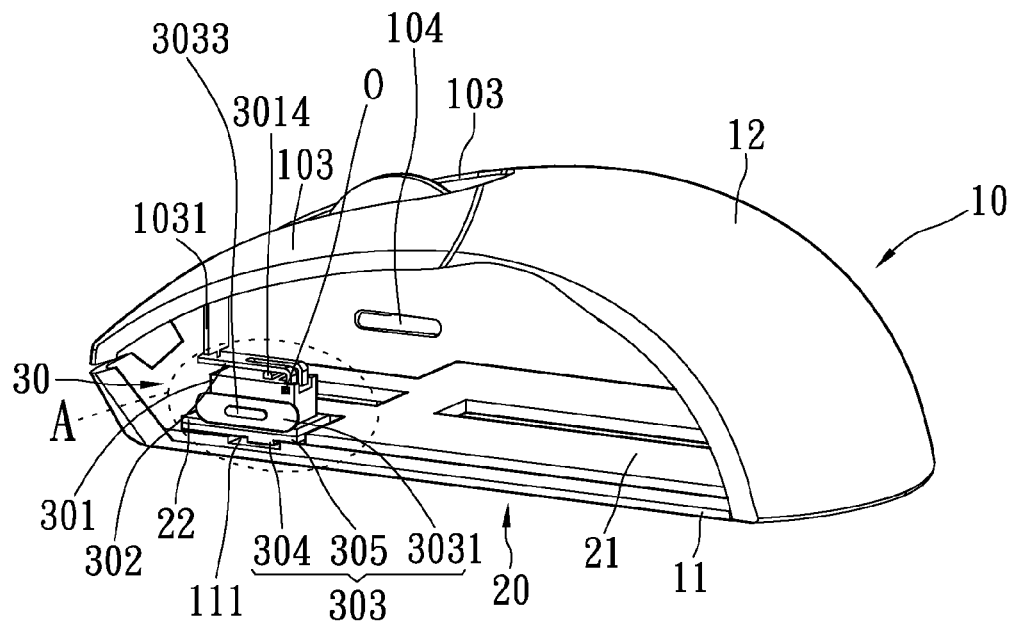
FIG. 1 is a schematic view of the mouse structure with adjustable click force function.
Figure 2:
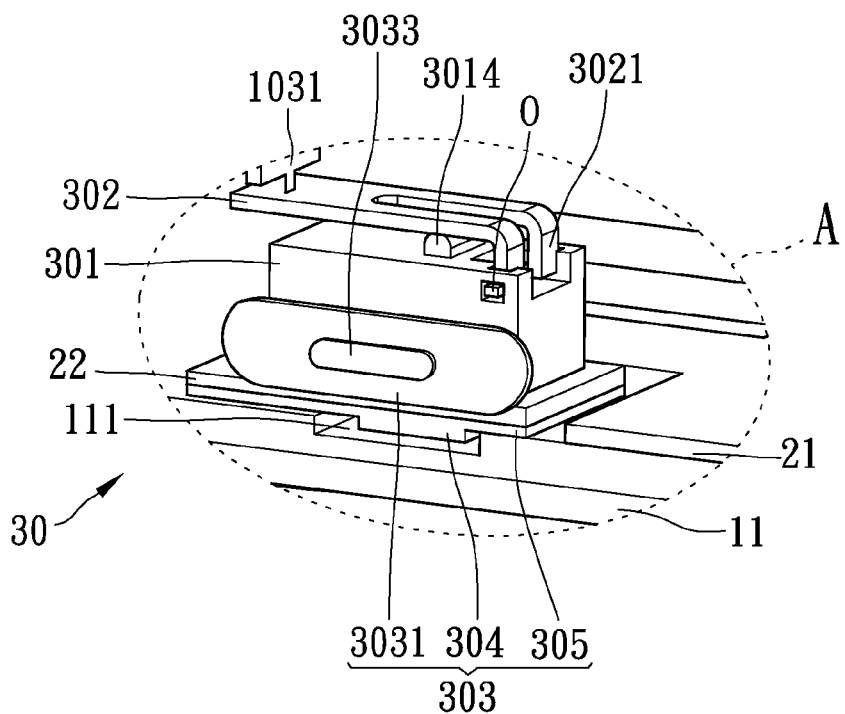
FIG. 2 is a partial enlargement view of A portion in FIG. 1.
Figure 3:
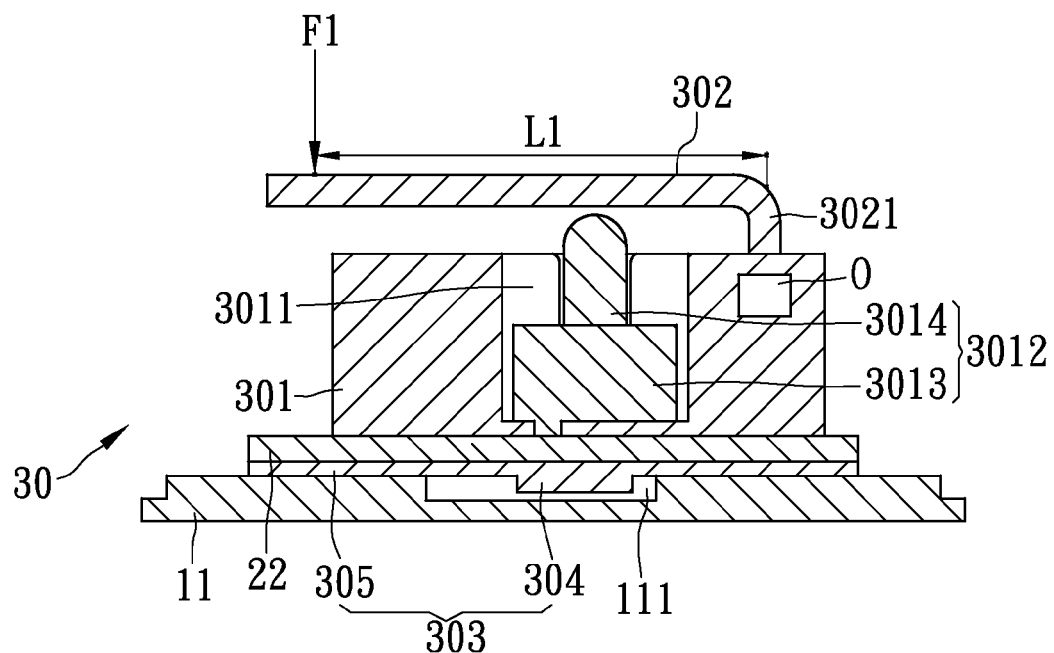
FIG. 3 is a sectional view of the adjustable mechanism in FIG. 1.

FIG. 1 is a schematic view of the mouse structure with adjustable click force function, FIG. 2 is a partial enlargement view of A portion in FIG. 1, and FIG. 3 is a sectional view of the adjustable mechanism in FIG. 1. Please refer to FIG. 1 to FIG. 3. The present invention, the mouse structure with adjustable click force function, comprises a shell 10, a circuit board module 20, and an adjustable mechanism 30.

There is a key portion, or button 103 located in the front of the outside of the shell 10. In the embodiment the number of the key portions or buttons 103 is two, and one of the key portions 103 is in the vicinity of/adjacent to another. The circuit board module 20 includes a main printed circuit board 21 and two printed circuit boards 22. The circuit board module 20 is located in the shell 10 and on the bottom, for example, thereof. The two printed circuit boards 22 are electrically connected with the main printed circuit board 21. The adjustable mechanism 30 is located in the shell 10. The position of the adjustable mechanism 30 is corresponding to the position of the key portion 103. The adjustable mechanism 30 is further electrically connected with the printed circuit boards 22 of the circuit board module 20. The invention, by adjusting the position of the adjustable mechanism 30, lets the position of the key portion 103 correspond to different positions of the adjustable mechanism 30 and adjusts the force of pivoting arm of the adjustable mechanism 30 which is pressed by the key portion 103. Therefore, the torque resulting from the click force could be further changed and the user can adjust the strength of the click force depending on his/her personal preferences or habits.

Referring to FIG. 2 to FIG. 3, the adjustable mechanism 30 includes a supporting body 301, an adjustable plate 302, and an adjustable component 303. The adjustable plate 302 and the adjustable component 303 are located on the supporting body 301. It is available in a manner such that the user can push the adjustable component 303 to further move the adjustable mechanism 30.

The supporting body 301 includes an accommodating chamber 3011, and a switch module 3012. The accommodating chamber 3011 is located at the place where the supporting body 301 is corresponding to the key portion 103, and the accommodating chamber 3011 is used for the switch module 3012. The switch module 3012 includes a switch element 3013 and a trigger element 3014. The trigger element 3014 is located above the switch module 3012 and the free end of the trigger element 3041 projects outside the accommodating chamber 3011. The trigger element 3041, as result of pressing/clicking, can ascend or descend to turn on or turn off the switch element 3013. Further, the switch element 3013 is further connected with the circuit board module 20 such that the information of clicking can be transmitted to the circuit board module 20.

The adjustable plate 302 is located below, for example, the key portion 103, and one side of the adjustable plate 302 extends toward the supporting body 301 to form an extending piece 3021 which is bent. By the extending piece 3021, the adjustable plate 302 is pivotally connected with the supporting body 301. The pivot is O. In such arrangement, the key portion 103 and the switch module 3012 are located/corresponding at different positions of the adjustable plate 302, letting the adjustable plate 302 be substantially horizontal and located above the switch module 3012. When the user clicks the key portion 103, the adjustable plate 302 will be pressed by the pressure from the key portion 103, and thus the adjustable plate 302 will further press the trigger element 3014, and then contact to the switch element 3013 in used. The clicking information will be transmitted to the circuit board module 20.

Figure 4:
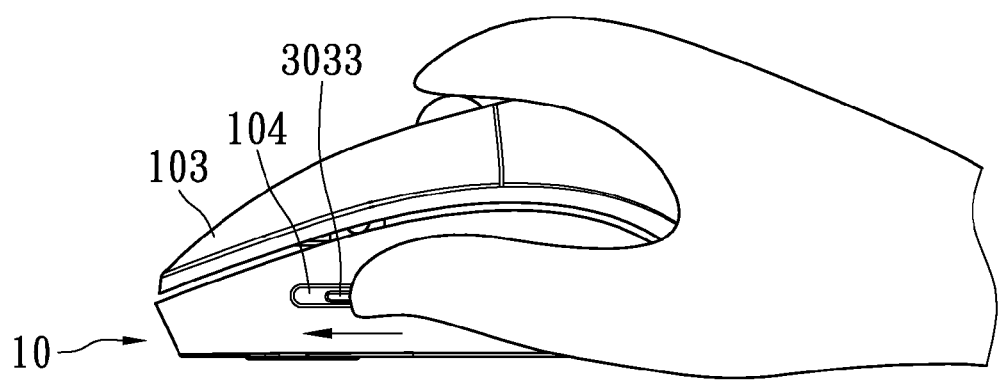
FIG. 4 is a using-state view of the mouse structure with adjustable click force function.

The following introduce the adjustable component 303 which moves the adjustable mechanism 30. The adjustable component 303 is movable and arranged in the shell 10. The adjustable component 303 can move the adjustable mechanism 30, further change the different position/portion of the free-end of the adjustable plate 302 of the adjustable mechanism 30 corresponding to the key portion 103, and adjust the magnitude of the force from the adjustable plate 302 applied to the switch element 3013. The adjustable component 303 includes a force transfer piece 3031 connected with the supporting body 301, and a guiding groove 104 located on the shell 10. The guiding groove 104 can set up on the upper surface or the bottom surface of the shell 10. In this embodiment, the guiding groove 104 is located on the upper surface of the shell 10 (for example, FIG. 4 is shown a guiding groove 104 located on the side of the shell 10). The force transfer piece 3031 is located on the side of the supporting body 301. There is a bump 3033 included/located on the force transfer piece 3031. The bump 3033 passes through the guiding groove 104 and partially exposed to the outside of the shell 10. When the invention is operated to adjust, pushing the bump 3033 can further move the whole adjustable mechanism 30. The force transfer piece 3031 and the bump 3033 of the adjustable component 303 mentioned above are use for explanation but not for limitation. The structure of the present invention can be changed as in actual needs.

In the present invention, the adjustable component 303 includes a base 305 which has an extending portion 304 protruding from the bottom of the base 305. The supporting body 301 of the adjustable mechanism 30 is located on the printed circuit board 22, and the printed circuit board 22 is located on the base 305. The base 305 supports the supporting body 301 and the printed circuit board 22. All the elements mentioned above can move with the adjustable mechanism 30. The printed circuit board 22 is electrically connected with the switch element 3013 and the main printed circuit board 21. After the switch element 3013 turned off, the clicking information is transmitted to the printed circuit board 22, and then the clicking information is transmitted to the main printed circuit board 21. The base 305 is made of wear-resisting material, especially with low-friction. The main reason to use the chosen material of the base 305 is to enhance the degree of wear-resisting of the adjustable mechanism 30, such that the printed circuit board 22 will not be damaged because of friction.

The shell 10 is assembled from, portions which entirely enclose sensitive parts needing protection, a bottom shell 11 and a cover shell 12 which is corresponding to the bottom shell, in order to form a receiving space. The upper surface of the bottom shell 11 has a recess 111 which is either: a, or rectangular in shape. The base 305 is located above the recess 111 and the extending portion 304 is located in the recess 111. The length and width of the recess 111 is larger than the length and width of the extending portion 304 but smaller than those of the base 305. Therefore, the adjustable mechanism 30 can move along with the recess 111 without shift. The structures of the base 305 and the recess 111 mentioned above are use for example but not for limitation and they can be changed as in actual needs. For example, it is available to use a rolling wheel to replace the base 305. The rolling wheel directly fixes under the supporting body 301 and the printed circuit board 22. The present invention is movable by the rolling wheel rolling in the recess 111.

In the present invention, the bottom (inner) surface of the key portion 103 of the shell 10 extends a contact portion 1031. The structure of the contact portion 1031 is shaped in column or piece. The contact portion 1031 is perpendicularly arranged above the adjustable plate 302. The contact portion 1031 is corresponding to the free-end of the adjustable plate 302, and one end of the contact portion 1031 contact the adjustable plate 302. When the key portion 103 is pressed, the contact portion 1031 which is pressed together with the key portion 103 will move to press the adjustable plate 302.

Figure 5:
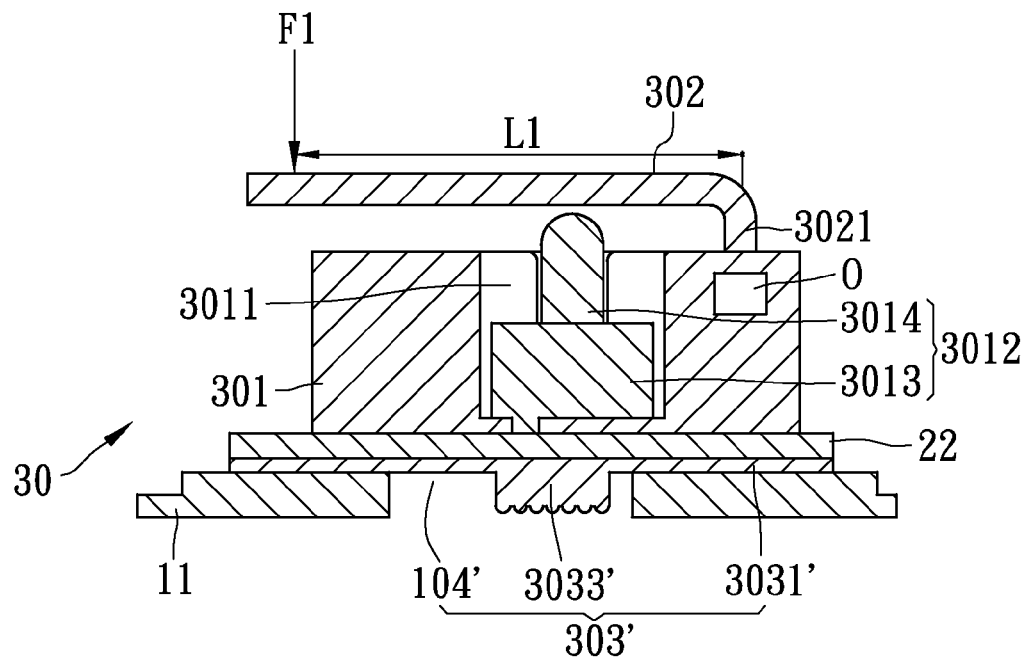
FIG. 5 is a sectional view of another embodiment of the present invention.

FIG. 5 is a sectional view of another embodiment of the present invention. FIG. 5 is used to shown another adjustable component 303'. In this embodiment, a guiding groove 104' is located on the bottom shell 11. A force transfer piece 3031' is located under the printed circuit board 22. The force transfer piece 3031' protrudes a bump 3033'. The force transfer piece 3031' is located above the guiding groove 104' and the bump 3033' is located in the bump 3033'. The length and width of the recess 104' is larger than the length and width of the bump 3033' but smaller than those of the force transfer piece 3031'. Therefore, the adjustable mechanism 30 can move along with the guiding groove 104' without shift (with a regular route). At the same time, the height of the bump 3033' is smaller than the thickness of the bottom shell 11, such that the bottom shell 11 can be stably settled. The adjusting method of this embodiment is similar to that of the first embodiment. When the user tries to adjust the adjustable mechanism 30, he/she can push the bump 3033' to further move the adjustable mechanism 30. The others elements in this embodiment are the same as the first embodiment, and they are not depicted for conciseness.

Figure 6:
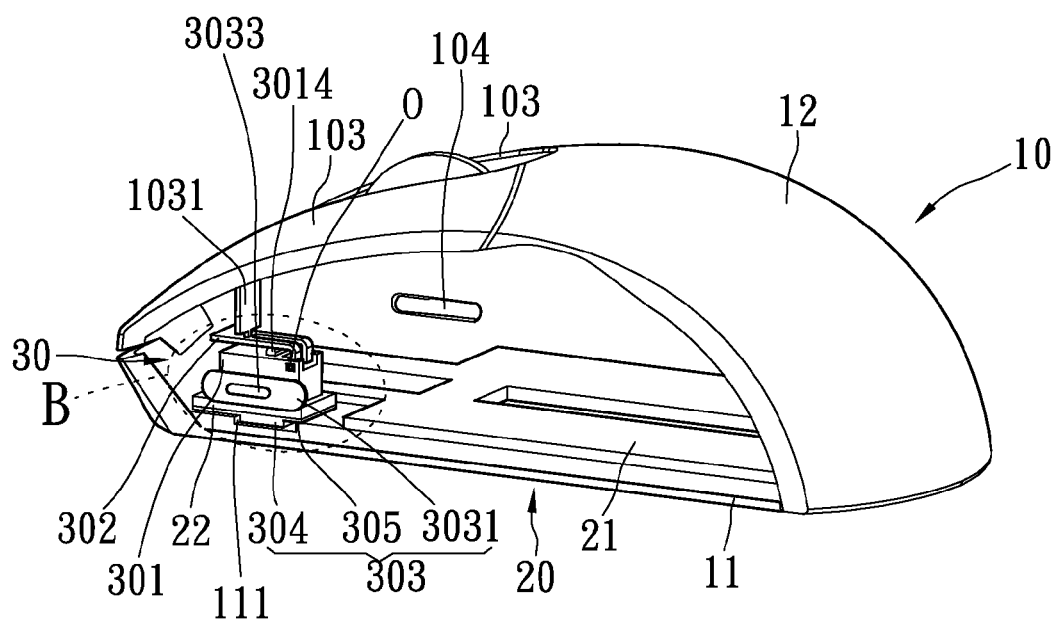
FIG. 6 is a perspective view of the mouse structure with adjustable click force function proceeding adjustment.
Figure 7:
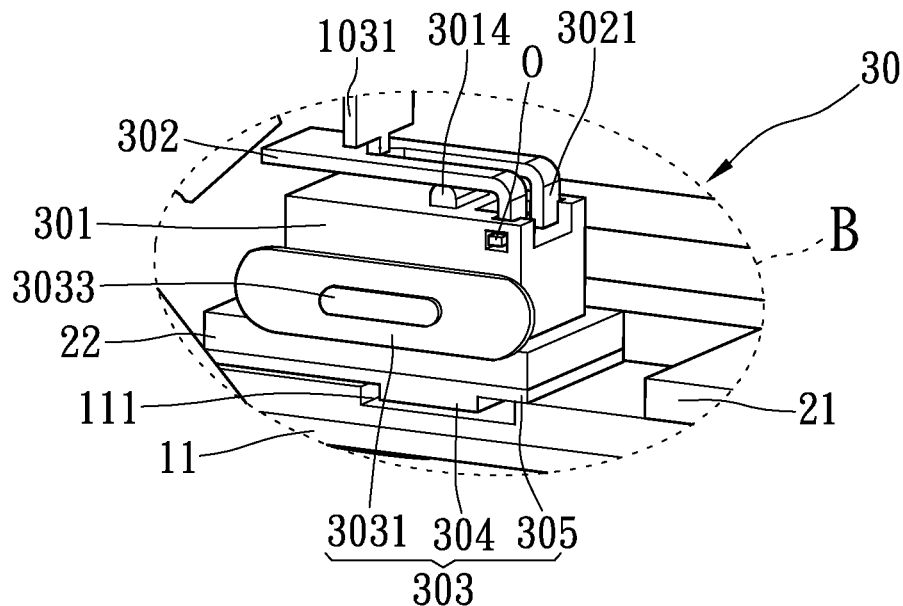
FIG. 7 is a partial enlargement view of FIG. 6.
Figure 8:
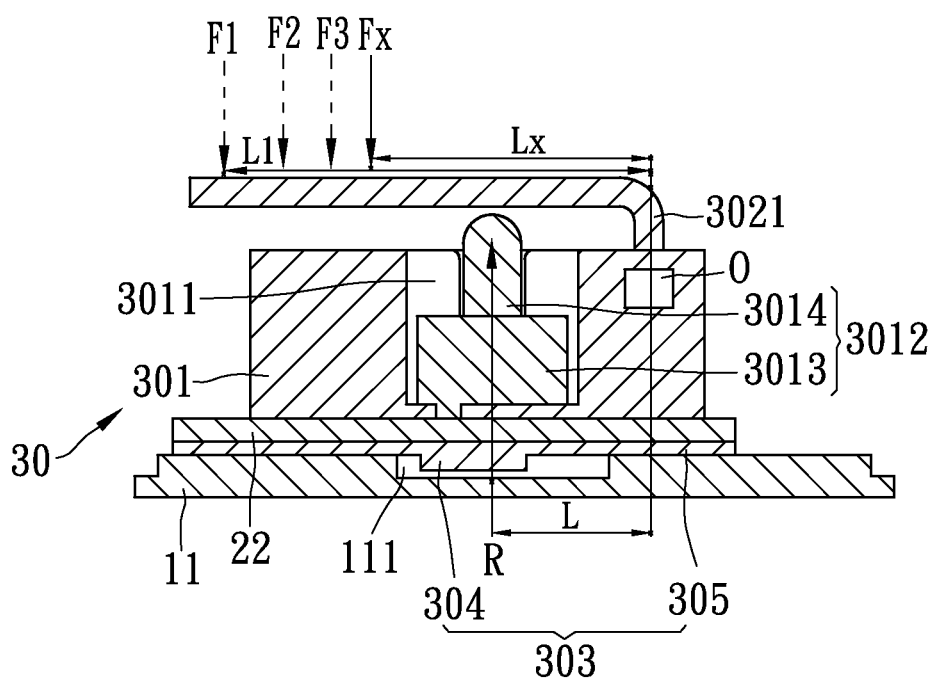
FIG. 8 is a sectional view of the adjustable mechanism in FIG. 6.

FIG. 6 is a perspective view of the mouse structure with adjustable click force function proceeding adjustment. FIG. 7 is a partial enlargement view of FIG. 6. FIG. 8 is a sectional view of the adjustable mechanism in FIG. 6, that is, a schematic view of the adjustable mechanism after sliding to the front of the mouse. Referring to FIG. 3, FIG. 5 and FIG. 8, it is understandable that the distance L between the trigger element 3014 and O is resistance arm, that when the trigger element 3014 contact the adjustable plate 302, resistance force R applied toward the adjustable plate 302 will be created. Therefore, based on the leverage principles, if the trigger element 3014 is needed to be triggered, the torque must be over R*L. FIG. 3 (or FIG. 5), the contact portion 1031 to the adjustable plate 302, shows the force of the pivoting arm $L_1$ and force $F_1$. Referring to FIG. 7 and FIG. 8, the force of the pivoting arm the contact portion 1031 of the contact portion 1031 toward the adjustable plate can be adjusted to $L_2$, $L_3$ ... $L_X$. The force is $F_X$. Apparently, $L_1 > L_X$.

Therefore, based on leverage principles, it is derived:

$$R*L = L_1*F_1 = L_X*F_X;$$

The value of R*L is a constant;
$L_1 > L_X$;
So, $F_1 < F_X$.

Therefore, the user can adjust the adjustable mechanism 30 to change the contact location between contact portion 1031 and adjustable plate 302, and further to change the strength of force clicking/pressing the key portion 103 of the mouse. In the embodiment, the more closed the adjustable mechanism 30 to the front of the shell 10 (the place $F_X$ exerts), the more force to click the mouse; vise versa, it would save force.

Figure 9:
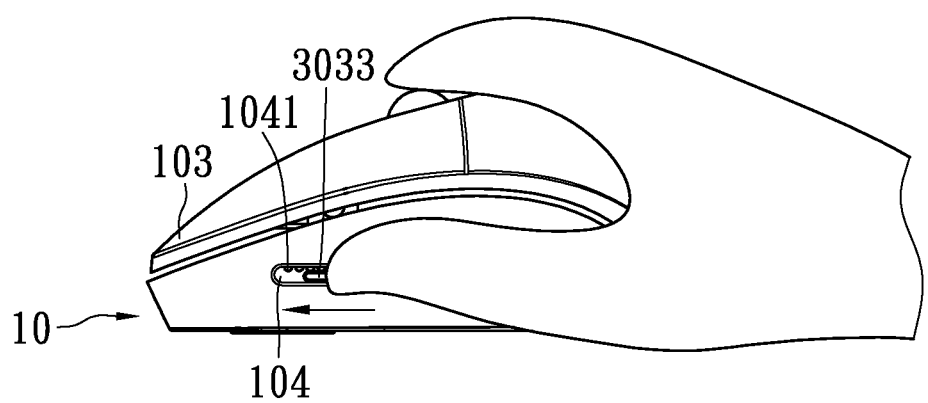
FIG. 9 is a schematic view of the third embodiment of the present invention.

Aside from, regarding to the embodiment of the structure of the adjustable mechanism 30 mentioned above, the user can slightly adjust the adjustable component 303. Moreover, as shown in FIG. 9, the user can also use the whorl 1041 of the guiding groove 104 corresponding to the guiding groove 104 for slight adjustment.

To sum up, the present invention, the mouse structure with adjustable click force function ingeniously applies leverage principles, adds an adjustable mechanism, and changes the location between the contact portion of the key portion and the adjustable mechanism, that is, change the force of pivoting arm to change the torque. The present invention changes the clicking force via changing the force of pivoting arm force.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A mouse structure with adjustable click force function, comprising:
    a shell including:
        a cover shell and a bottom shell;
        a guiding groove formed on the cover shell; and
        at least one key portion, each of the key portion having an elongated contact portion;
    a circuit board module located in the shell; and
    at least one adjustable mechanism, located in the shell, electrically connected to the circuit board module, the adjustable mechanism including:
        a supporting body, corresponding to the key portion and having a switch module, the switch module transmitting information of clicking to the circuit board;
        an adjustable plate, having an end connected to the supporting body, wherein the adjustable plate is arranged suspendedly below the elongated contact portion and above the switch module and the elongated contact portion selectively contacts the adjustable plate; and
        an adjustable component, horizontally movable on the bottom shell, wherein the supporting body is retained on the top of the adjustable component and the adjustable component further includes a bump protruding from the guiding groove for adjusting the position of the adjustable mechanism;
    wherein the adjustable mechanism moves along the guiding groove upon adjustment allowing different contact points between the elongated contact portion and the adjustable plate.

2. The mouse structure with adjustable click force function as claimed in claim 1, wherein the key portions are corresponding to the adjustable mechanisms, each switch module of the adjustable mechanism is further electrically connected to the corresponding circuit board module.

3. The mouse structure with adjustable click force function as claimed in claim 1, wherein the adjustable plate includes an extending piece, the adjustable plate is connected with the supporting body by the extending piece and suspends between the contact portion and the supporting body.

4. The mouse structure with adjustable click force function as claimed in claim 1, wherein the switch module includes a switch element and a trigger element, the trigger element is pressed by the adjustable plate to turn on or turn off the switch element.

5. The mouse structure with adjustable click force function as claimed in claim 1, wherein the adjustable component includes a force transfer piece and a guiding groove located on the shell, and the force transfer piece includes a bump, located and linearly movable in the guiding groove.

6. The mouse structure with adjustable click force function as claimed in claim 1, wherein the elongated contact portion is shaped in a column or piece structure, the elongated contact portion is perpendicularly arranged above the adjustable plate.

7. The mouse structure with adjustable click force function as claimed in claim 1, wherein the shell has a recess, the adjustable component includes a base which has an extending portion, and the extending portion is received by the recess in a linearly slidable manner.

\* \* \* \* \*